July 8, 1958  L. A. PETERMANN ET AL  2,842,685
BENDER TUNED ARRAY
Filed Dec. 23, 1955  2 Sheets-Sheet 1

INVENTORS
LUCIEN A. PETERMANN
LAWRENCE C. OAKLEY
BY
*Cyrus D. Samuelson*
ATTORNEY

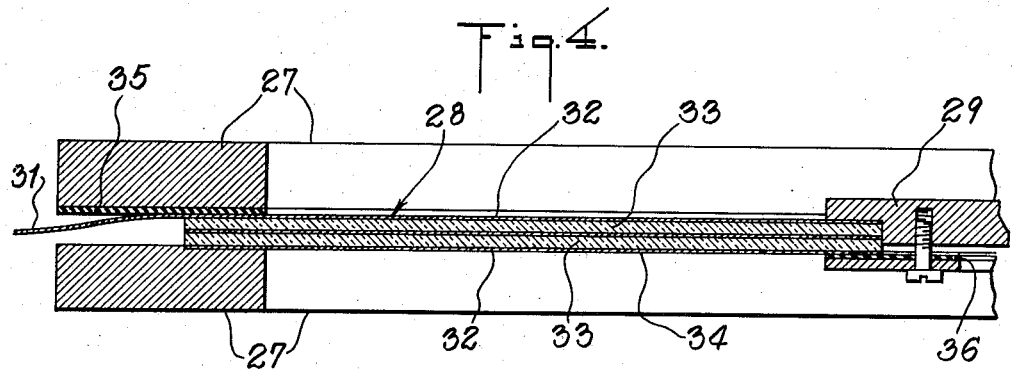
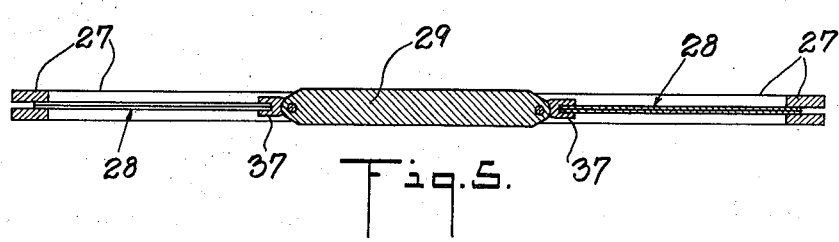
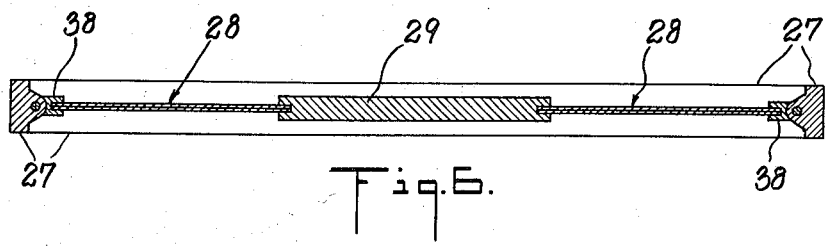
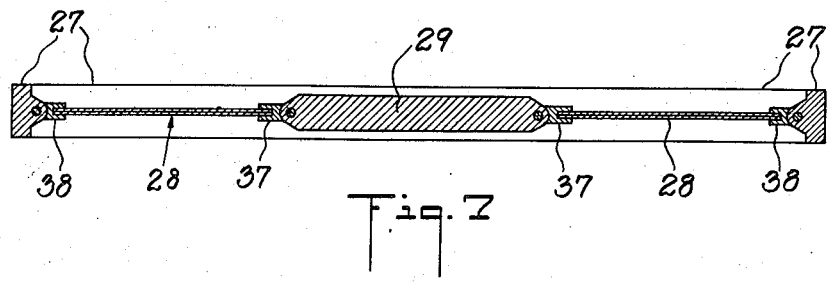

United States Patent Office 2,842,685
Patented July 8, 1958

2,842,685

BENDER TUNED ARRAY

Lucien A. Petermann, Deans, and Lawrence C. Oakley, Greenbrook Township, N. J., assignors to Gulton Industries, Inc., a corporation of New Jersey Application December 23, 1955, Serial No. 555,009

5 Claims. (Cl. 310—8.3)

Our invention relates to bender tuned arrays and in particular to those bender tuned arrays which employ a plurality of individual piezoelectric bender elements and which possess a low resonant frequency.

Up to now, it has been necessary to increase the dimensions of the active element of an electro-mechanical transducing system when a lower frequency was desired. At the lower resonant frequencies, these elements become too large to be easily produced in commercial quantities with the consequent result that there has been a limited use of low frequency sonic equipment. This has been particularly apparent in the field of subaqueous detection, ranging and signalling.

Accordingly, it is a principal object of our invention to provide a bender tuned array with a low fundamental resonant frequency.

It is a further object of our invention to provide a bender tuned array of reasonable dimensions which may be produced simply and economically.

Other objects and advantages of our invention will be apparent during the course of the following description.

Figure 1:
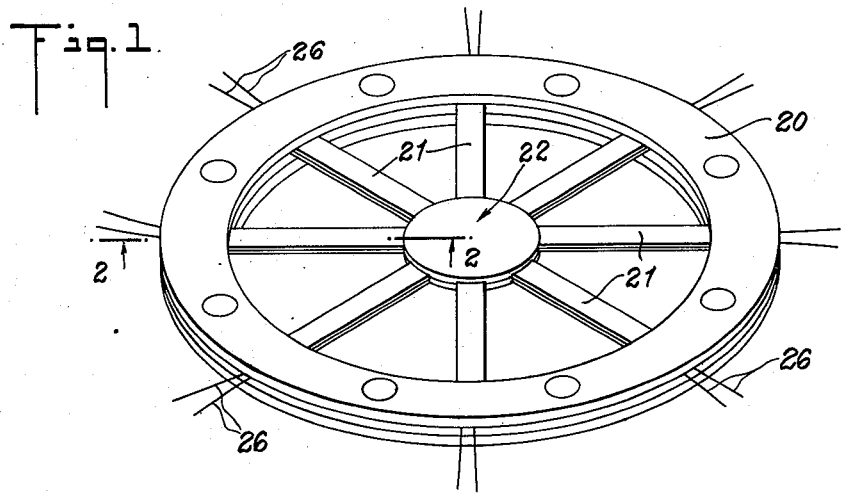
Figure 2:
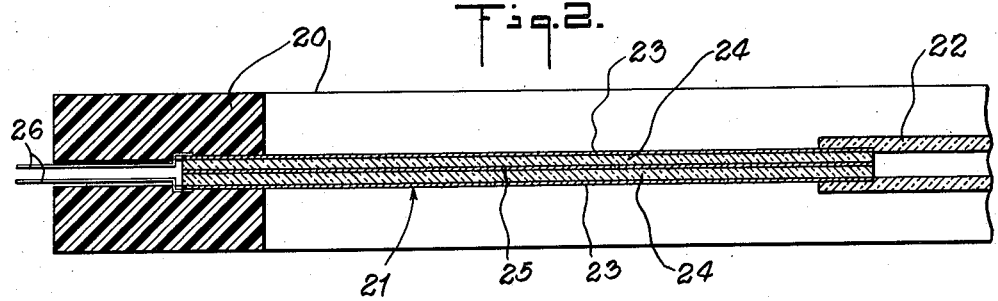
Figure 3:
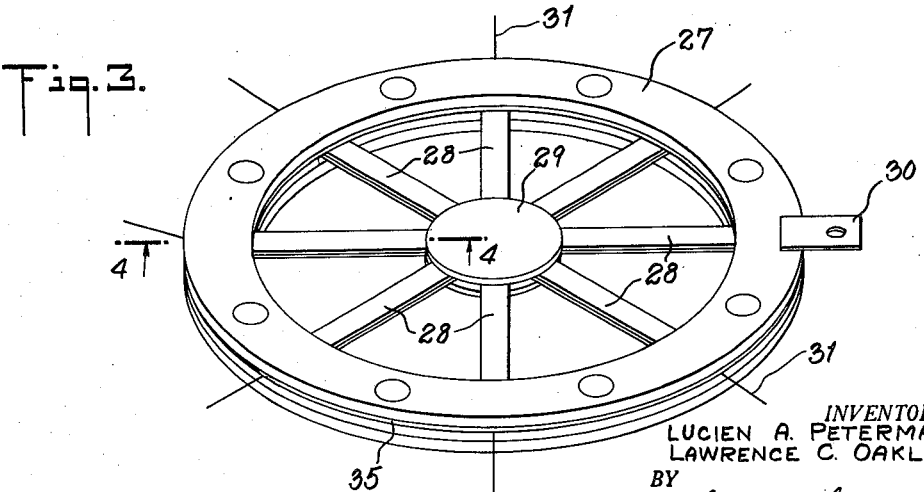

In the accompanying drawings, forming a part of this application, and in which like numerals are employed to designate like parts throughout the same, Figure 1 is a perspective view of an embodiment of our invention, Figure 2 is a cross-sectional view along the line 2—2 of Figure 1, Figure 3 is a perspective view of a further embodiment of our invention, Figure 4 is a cross-sectional view along the line 4—4 of Figure 3, Figure 5 is a simplified elevational view of a variation of the embodiment of Figure 3 wherein the individual bender elements are joined to the diaphragm articulatively, Figure 6 is a simplified elevational view of a further variation of the embodiment of Figure 3 wherein the individual bender elements are joined to the outer member articulatively, and Figure 7 is a simplified elevational view of a still further variation of the embodiment of Figure 3 wherein the individual bender elements are articulatively joined to both the diaphragm and the outer member.

In the drawings, wherein for the purpose of illustration, are shown preferred embodiments of our invention, the numeral 20 designates the outer ring member, to which is fixedly held one end of each bender element 21, the other end of each bender element 21 is fixedly held to diaphragm 22. Bender element 21 comprises outer electrodes 23, piezoelectric elements 24, central conductor 25 and electrical connection leads 26. Bender elements 28 are clamped to outer ring 27 and to diaphragm 29. Electrical connection to each bender element 28 is made by common connection 30 and individual lead 31. Bender element 28 comprises outer electrodes 32, piezoelectric elements 33, central conductor 34 and electrical connection lead 31. Insulator 35 serves to prevent shorting lead 31 to ring 27 and insulator 36 serves to prevent shorting across bender 28 at diaphragm 29. Articulated connection 37 serves to join 28 to 29 and articulated connection 38 serves to join 28 to 27.

Bender tuned arrays of our invention may be employed as subaqueous sonic or ultrasonic transmitters or receivers or for any other use which requires low frequency sonic or ultrasonic energies of high intensities.

Diaphragm 22 is composed of two discs of glass or other suitable insulating material. One end of each bender 21 is cemented or otherwise fixedly held between the two glass discs of 22 with resin or a similar suitable material. Outer ring 20 is formed of a hard resin base such as epoxy resin and the opposite end of each bender 21 is suitably clamped in 20. Electrical leads 26 are insulated from each other and are brought out through 20. The electrical leads 26 are each separately connected to one of the bender electrodes 23 and serve to supply excitation voltage to 21. Benders 21 comprise piezoelectric elements 24, which may be made of polarizable ceramic such as barium titanate or other piezoelectric material, electrodes 23 applied to the outer surfaces of 24 and a central conducting element 25 which makes electrical connection to both inner surfaces of elements 24.

Leads 26 from the several individual benders 21 may be connected in many different ways to the driving generator such as series, parallel, series-parallel, phases reversed and so forth.

By way of example and not by way of limiting the scope of our invention, we have obtained resonance frequencies as low as 1.6 kc. in liquids and 1.74 kc. in air when utilizing bender tuned arrays of the embodiment illustrated in Figures 1 and 2 and with the following dimensions: Thickness of 22=0.36 mm.; diameter of 22=18 mm.; outside diameter of 20=88 mm.; inside diameter of 20= 58 mm.; thickness of 20=13 mm.; length of 21=1 in.; width of 21=.066 in.; and thickness of 21=.026 in.

Outer ring 27 is a split ring of two metal elements which are held together by screws or similar means. The ends of piezoelectric elements 28 are fixedly held between the metal elements of ring 27. Insulator 35 insulates upper electrode 32 and electrical lead 31 from outer ring 27. Lower electrode 32 makes electrical contact with ring 27, thereby permitting utilization of common connection 30 for one side of all piezoelectric elements 28. Insulator 36 insulates lower electrode 32 from diaphragm 29 and serves to prevent short circuiting 28. 36 further serves to prevent short circuiting between 27 and 29.

28 is comprised of outer electrodes 32, piezoelectric elements 33, central conductor 34 and electrical lead 31. The piezoelectric elements 33 may be polarizable ceramic such as barium titanate or any other natural or artificial piezoelectric.

Diaphragm 29 serves to help determine the resonant frequency of the system since it serves to mass-load the elements 28. Suitable selection of the area of 29 is important due to the fact that 29 serves to match the transducer to the medium. The larger 29 is in area, the better is the matching to media of low acoustical impedance such as gases and liquids.

By way of a second example and not by way of limiting the scope of our invention, we have first resonant frequencies of the order of 400 cycles with the following dimensions:

Outer diameter of 27=340 mm.; inner diameter of 27=280 mm.; thickness of 27=20 mm.; 8 elements 28, length=120 mm. (10 mm. at each end, clamped), thickness=6 mm., width=15 mm., all equally spaced; diameter 29 (metal)=80 mm.; and thickness 29=4 mm.

Figure 5 is a simplified drawing of the mounting of elements 28 (not in complete detail) illustrating an articulated connection 37 between 28 and 29. Maintaining all dimensions as given in the second example and adding articulated connections 37 between 28 and 29 changes the first resonant frequency to 252 cycles.

Figure 6 is a simplified drawing of the mounting of elements 28 (not in complete detail) illustrating an articulated connection 38 between 27 and 28. Maintaining all the dimensions as given in the second example and adding articulated connections 38 between 28 and 29 changes the first resonant frequency to 215 cycles.

Figure 7 is a simplified drawing of the mounting of elements 28 (not in complete detail) illustrating articulated connection 37 between 28 and 29 and articulated connection 38 between 27 and 28. Maintaining all the dimensions as given in the second example and adding articulated connections 37 between 28 and 29 and articulated connections 38 between 27 and 28 changes the first resonant frequency to 1357 cycles.

Our invention is not limited to closed circularly shaped outer elements as illustrated in the figures and described in the specification; polygons, triangles, squares, rectangles, linear arrays and unclosed portions of such geometrical figures may be used as outer elements of arrays produced in accordance with our invention.

While we have described our invention by means of specific examples and in specific embodiments, we do not wish to be limited thereto, for obvious modifications will occur to those skilled in the art without departing from the spirit of the invention or the scope of the subjoined claims.

Having thus described our invention, we claim:

1. A bender tuned array comprising a plurality of piezoelectric bender elements, one end of each of said piezoelectric bender elements being fixedly held to a substantially centrally placed, nonflexible diaphragm of substantial mass, the other end of each of said piezoelectric bender elements being fixedly held to an outer element, and electrical connection means for making connection to the bender elements.

2. A bender tuned array as described in claim 1, wherein one electrical connection to the said piezoelectric bender elements is common to all the said piezoelectric bender elements.

3. A bender tuned array as described in claim 1 wherein the said piezoelectric bender elements are held to said diaphragm by articulated joints.

4. A bender tuned array as described in claim 1 wherein the said piezoelectric bender elements are held to said closed outer element by articulated joints.

5. A bender tuned array as described in claim 1 wherein the said piezoelectric bender elements are held to said outer element and to said diaphragm by articulated joints.

References Cited in the file of this patent

UNITED STATES PATENTS

| | | |
|---|---|---|
| 1,693,806 | Cady | Dec. 4, 1928 |
| 2,451,966 | Massa | Oct. 19, 1948 |
| 2,497,680 | Massa | Feb. 14, 1950 |

FOREIGN PATENTS

| | | |
|---|---|---|
| 235,664 | Switzerland | Apr. 16, 1945 |